US006533839B2

(12) United States Patent
Janisch et al.

(10) Patent No.: US 6,533,839 B2
(45) Date of Patent: Mar. 18, 2003

(54) VISUAL DIFFERENTIATION OF ADSORBENT-LOADED MEDIA

(75) Inventors: Jason D. Janisch, Shawnee Mission, KS (US); Robert M. Swinehart, Marine, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/925,563

(22) Filed: Aug. 9, 2001

(65) Prior Publication Data

US 2003/0029320 A1 Feb. 13, 2003

(51) Int. Cl.⁷ ............................................. B01D 53/04
(52) U.S. Cl. ............................ 95/25; 96/117.5; 96/154; 210/502.1
(58) Field of Search ................................ 96/108, 117.5, 96/134, 135, 153, 154; 55/524, 529; 210/502.1, 503, 504; 428/323, 324; 423/449.1, 449.2; 502/416, 439; 95/25

(56) References Cited

U.S. PATENT DOCUMENTS

| 3,538,020 | A |   | 11/1970 | Heskett et al. |
| 3,971,373 | A |   | 7/1976  | Braun |
| 4,433,024 | A |   | 2/1984  | Eian |
| 4,981,501 | A |   | 1/1991  | Von Blücher et al. |
| 5,049,365 | A | * | 9/1991  | Okabayashi et al. ..... 423/245.1 |
| 5,145,061 | A |   | 9/1992  | Marceau |
| 5,332,426 | A |   | 7/1994  | Tang et al. |
| 5,417,743 | A | * | 5/1995  | Dauber .................... 360/97.02 |
| 5,486,410 | A |   | 1/1996  | Groeger et al. |
| 5,503,738 | A | * | 4/1996  | DeFilippi et al. ........... 210/150 |
| 5,733,451 | A | * | 3/1998  | Coellner et al. ............ 210/496 |
| 5,766,312 | A | * | 6/1998  | Furhmann et al. ............ 95/117 |
| 5,779,847 | A |   | 7/1998  | Groeger |
| 6,152,990 | A | * | 11/2000 | Allen et al. .................... 95/107 |
| 6,207,255 | B1 |  | 2/2001  | Fukuura et al. |

FOREIGN PATENT DOCUMENTS

| DE | 3815907  | 12/1988 |
| FR | 2806007  | 9/2001 |
| JP | 04256436 | 9/1992 |
| JP | 07289865 | 11/1995 |

* cited by examiner

Primary Examiner—David A. Simmons
Assistant Examiner—Frank M. Lawrence
(74) Attorney, Agent, or Firm—Gary L. Griswold; Robert W. Sprague; William J. Bond

(57) ABSTRACT

There is provided a three-dimensional adsorbent particle filter having a width, depth and at least one exposed outer face. The filter comprises darkly colored adsorbent particles having an L-value of 60 or less, preferably 20 or less providing a dark contrasting background. Reflective particles are present at the outer face of the filter at levels that allow a user to visually differentiate the filter based on the contrast between the reflective particles and the dark adsorbent particles. Different reflective particle or combinations of reflective particles are used with different filters to differentiate the filters each from the other.

9 Claims, No Drawings

VISUAL DIFFERENTIATION OF ADSORBENT-LOADED MEDIA

BACKGROUND AND FIELD OF THE INVENTION

U.S. Pat. No. 5,332,426 describes a self-supporting filter formed of agglomerated absorptive particles. The carbon or other similar absorptive materials are preheated to a temperature generally above the softening temperature of the binder particles. The binder particles are then added under mixing conditions resulting in the formation of agglomerates of the binder and adsorbents. The binder particles are attached to the surface of the adsorptive particles which results in the formation of agglomerates. The agglomerates can then be further joined to each other under heat and optionally a certain amount of pressure, to directly form a carbon filter. The direct mixing of binder and activated carbon and the like is described in U.S. Pat. No. 3,538,020. In this case, the carbon and binder are directly formed into a filter without the intermediate formation of agglomerates.

Activated carbon or other absorptive particles are also attached to supporting structures such as disclosed in U.S. Pat. No. 4,981,501. In this patent, a carrier framework comprised of wires, monofilaments or stays are coated with an adhesive or binder following which activated carbon or like absorptive particles are added. The distances between the elements of the support structure are wide enough to allow the carbon particles to interpenetrate into the depth of the structure covering the support or structure elements. A similar-type support structure is disclosed in U.S. Pat. No. 6,207,255.

It is also known to physically entrap carbon particles, and the like within a support structure, such as disclosed in U.S. Pat. No. 4,081,501. In this patent, carbon particles or the like are mixed with air and forced into a fibrous web, although an adhesive can be added for further binding, the particles penetrate into the support structure under the force of the air pressure and become entrapped. In U.S. Pat. Nos. 3,971,373 and 4,433,024 binder particles are structurally entrained in a blown microfiber web by introducing particles into the fiber stream prior to collection of the fibers as a coherent web. This method allows a large quantity of adsorbent particles to be contained within a matrix where the particles can comprise up to 99% of the web structure and then can be joined to a further layer.

U.S. Pat. No. 5,486,410 describes blending in bonding fibers with structural fibers and particles followed by heating to consolidate and join all the various elements of the web together. The web itself can be formed by carding or similar type web forming processes. The bonding fibers are generally fibers, which have components having a lower melting point, which serves as an adhesive or bonding element to bond the bonding fibers to the particles and/or the structural fibers.

With all these webs, particularly when carbon is used as the adsorbent, the filter will be black or similarly dark in color. This allows only a limited ability to visually differentiate between different qualities and grades of filter webs with the end customer. With particulate type filters formed of thermoplastic fibers and the like is possible to use different color fibers or print patterns or the like on the filters in order to provide visual differentiation. However with carbon materials, printing is difficult and could result in obstruction of the pores of the adsorbents reducing their efficacy. Coloring of black carbon or like adsorbent particles is difficult if not impossible. The present invention is directed at a way to visually differentiate activated carbon containing filters, which would allow various grades of adsorbent filters to be visually differentiated or provide other information concerning the filter quality or performance without significantly impacting absorptive performance of the filter.

BRIEF DESCRIPTION OF THE INVENTION

The invention relates to a three-dimensional adsorbent particle filter having a width, depth and at least one exposed outer face. The filter comprises darkly colored adsorbent particles having an L-value of preferably 20 or less providing a dark contrasting background. Reflective particles are present at the outer face of the filter at levels that allow a user to visually differentiate the filter based on the contrast between the reflective particles and the dark adsorbent particles.

The invention also relates to a method of differentiating various darkly colored adsorbent particle filters. The adsorbent particle filter has a width, depth and at least one exposed outer face. The filter comprising adsorbent particles visible on an outer face so that the filter has an L-value of 60 or less, preferably 20 or less. Reflective particles are present at the outer face at a percent by area to be clearly visible. Different reflective particle or combinations of reflective particles are used with different filters to differentiate the filters each from the other.

DETAILED DESCRIPTION OF THE INVENTION

The present invention relates to a three-dimensional, preferably substantially planar adsorptive (preferably comprising an activated carbon) filter structure with at least one outer face. The structure has a depth or width dimension with the at least one outer face exposed during use by the end user. The outer face is preferably predominantly comprises activated carbon or similarly darkly colored adsorbent particles. Generally, the adsorbent particles are granular particulate materials of from 0.1 to 2 mm size range, preferably 0.2 to 0.6 mm which are either self-supporting, such as disclosed in U.S. Pat. No. 5,332,426, joined to a substrate, such as disclosed in U.S. Pat. No. 4,981,501, or physically incorporated into a web structure such as disclosed in U.S. Pat. Nos. 5,779,847 or 3,971,373 the substance of which patents are incorporated herein by reference in their entirety. The at least one outer surface will comprise predominantly adsorbent carbon particles or the like such that it is a darkly colored material preferably an L-value (L.a.b. measured by for example ASTM D 2244 -93) of 60 or less, preferably less than 40 more preferably 20 or less. Preferably the outer surface will comprise solely activated carbon or like darkly colored absorptive particles but the particles could be partially covered by a scrim or the like. The particles can be joined to each other or be in or on a support structure or the like with optional binders or adhesives as is well known in the art.

In order to provide a visual differentiation to the carbon or like particles the support structure or the adsorbent particles or both, at least at the one outer surface, will have reflective particles such as vapor coated plastic film, polymer coated foils, metal foils and the like. There are small particles, generally 0.05 mm to 1.0 mm, preferably 0.1 mm to 0.4 mm mean particle size in its largest dimension. The reflective particles will have at least one surface having mirror (specular) or retroreflective properties as opposed to diffuse reflective properties. Mirror reflective surfaces are surfaces that reflect light at an angle equal but opposite to the incident angle. Retroreflective surfaces will return a substantial portion of the incident light to the source. Generally, the reflective particles of the invention will direct at least 40 to 100 percent of incident light to a specific predetermined angle, preferably at least 60 to 100 percent and most preferably at least 75 to 100 percent. The retroreflective particles are present at the outer face of the adsorbent filter at a level to be clearly visible to a potential user and are attached by use of adhesives and the like. Generally the reflective particles will comprise 10 percent or less by weight of the filter media, preferably 5 percent or less. The reflective particles can be incorporated at the time the adsorbent filter is formed such that they are attached to the adsorbent particles and/or support by the use of adhesives, binder or bonding fibers, which are applied or used during the manufacture of the adsorbent carbon filter. Alternatively, adhesives or binders can be patterned sprayed onto the filter following formation. If an adhesive, or like, binder is applied following formation of the web, it will be provided intermittently so as to not to substantially obstruct the pore structure of the adsorbent particles and still allow a suitable weight percentage of reflective particles to be added. Generally, after applied, adhesives or binders would cover from 2 to 50, preferably from 2 to 20% of the adsorbent filter outer face surface area. The adhesive or binder also preferably has a viscosity of from 300 to 800 centipoise, more preferably 400 to 650 centipoise, when used in a spray adhesive application so as not to substantially wet or coat the adsorbent particle. The reflective particles can then be gravity-fed or sprinkled onto the adhesive coated carbon and shaken to remove any excess particles. Alternatively, the reflective particles can be mixed with a substantially clear adhesive or binder and sprayed or otherwise applied to the adsorbent web. Reflective particles can also be entrained within an airstream and blown onto the outer surface of an adsorbent web if desired.

The invention finds particular use as a method of identifying darkly colored adsorbent filters based on grade or performance. Particularly, different colored reflective particles or combinations of reflective particles can be used with different adsorbent filters to identify the particular application or performance level for which the filter is designed to differentiate the filter from other absorbent filters. Adsorbent filters vary widely in application depending on the adsorbent selected the format of the adsorbent or the amount of adsorbent. As they all tend to be visually the same, darkly colored, it is difficult to differentiate filters based on casual inspection. The invention provides a method to provide this differentiability without any significant effect on filter performance.

EXAMPLES

Example 1

A dispersion of glitter particles (Micronic Jewels, 12.7 microns (0.0005 inches) thick by 101.6×101.6 microns (0.004×0.004 inches), green in color, available from Meadow Brooks Inventions, Inc., Bernardsville, N.J. under the designation PU200404) in a clear acrylic polyurethane gloss latex (available as Stays Clear Acrylic Polyurethane-422 00 from Benjamin Moore Paints, Montvale, N.J.) was prepared by adding the glitter particles to the acrylic latex (1 part to 4 parts respectively, by weight) and stirring the resulting mixture until a homogeneous dispersion was obtained. The resulting dispersion was applied to a carbon loaded nonwoven web using a gravity feed spray gun (DeVilbiss model FLG-611 from ITW Industrial Finishing, Binks.DeVilbiss, Glendale Heights, Ill.) using a standard 0.14 mm (0.055 inches) aperture spray tip supplied with the spray gun. The glitter dispersion was applied to an adsorbent loaded staple fiber nonwoven filtration media made from polyester staple fibers, latex resin, and powdered carbon with a basis weight of 400 g/m$^2$ (available under the trade designation #5113 S/3M-B type, roll #01011-2, from Kuraray Chemical Inc., Osaka, Japan) under (45 psi) at a spray tip to web distance of approximately 0.6 m (2.0 feet). (Approximately four spray application passes were required to achieve a glitter loading that produced a visual differentiation.) Subsequent to application of the glitter dispersion the coated web was dried in a circulating air oven operating at 100° C. for about 5 minutes. The add on coating weight of the dried glitter/binder dispersion was approximately 40 g/m$^2$, which produced a distinct visual differentiation of the non woven web appearance.

Example 2

A glitter loaded web was prepared substantially as described in Example 1 except that the green glitter was replaced with a gold glitter, 11.4 microns (0.00045 inches) thick by 203.2×203.2 microns (0.008×0.008 inches), pale gold in color, available from Meadow Brooks Inventions, Inc. under the designation Metallic Jewels—Pale Gold 3E) and only a single spray application pass we required to produce a glitter loading capable of producing a visual differentiation of the web. The add on coating weight of the dried glitter/binder dispersion was approximately 32 g/m$^2$.

Example 3

A glitter/binder dry mix was prepared by adding glitter particles (green Micronic Jewels glitter described in Example 1) to an adhesive powder (Foil and Flocking Adhesive Powder, #18 graduation, available from Thermo-O-Boss, Escondido, Calif.) at a 1 part to 3 parts by weight ratio and shaking the resulting mixture in a plastic bag until a uniform mixture of glitter and adhesive was obtained. The resulting mixture was sprinkled on a carbon loaded web (described in Example 1) at a add on weight of approximately 10 gm/m$^2$, and the loaded web placed in a circulating air oven operating at approximately 70–80° C. for approximately 3 minutes (plastic binder turns from white to clear) to cure the adhesive and produce a visually differentiable web.

Example 4

A carbon loaded staple fiber web (described in Example 1) was sprayed on one surface with 15 g/m$^2$ (wet weight) of an acrylic based pressure sensitive adhesive (available under the trade designation "Spray 77 Super Adhesive" from 3M Company, St. Paul, Minn.) and then gold glitter flakes were applied to the web at a loading of 5 g/m$^2$ by uniformly shaking the glitter flakes (described in Example 2) from a cup unto the adhesive coated web. The thus coated and glitter flake loaded web was allowed to dry at ambient temperatures to produce a visually differentiable web.

Example 5

A glitter flake loaded adsorbent loaded web was prepared substantially as described in Example 4 except that the glitter was applied to the adhesive coated web as a mixture of glitter flake in an 80×325 mesh, CTC 60 granular carbon (available from Calgon Carbon Corporation, Pittsburgh, Pa.). The glitter and carbon granules were mixed in a separate container (5% by weight glitter) prior to application to the nonwoven web. The adhesive coated web was saturated with the glitter flake/granular carbon mixture and the web tapped by hand to knock off excess (unadhered) carbon and glitter.

We claim:

1. A three-dimensional adsorbent particle filter having a width, depth and at least one exposed outer face, the filter comprising adsorbent particles, the filter having an L-value of less than 60 at the exposed outer face of the filter, and reflective particles comprising vapor coated plastic films are present at the filter outer face.

2. The three-dimensional adsorbent particle filter of claim 1 wherein the adsorbent particles comprise activated carbon.

3. The three-dimensional adsorbent particle filter of claim 1 wherein the reflective particles have a mean particle size of 0.05 to 1.0 mm.

4. The three-dimensional adsorbent particle filter of claim 1 wherein the absorbent particles are granular carbon with a particle size of from 0.1 to 2 mm.

5. The three-dimensional adsorbent particle filter of claim 1 wherein the reflective particles are attached to the adsorbent filter by an adhesive.

6. The three-dimensional adsorbent particle filter of claim 1 wherein the reflective particles are attached to the adsorbent filter by an adhesive wherein the filter has an L-value of less than 20.

7. The three-dimensional adsorbent particle filter of claim 1 wherein the reflective particles are attached to the adsorbent filter by an adhesive wherein the filter has an L-value of less than 40.

8. A method of differentiating various adsorbent particle filters by providing a darkly colored adsorbent particle filter having a width, depth and at least one exposed outer face, the filter comprising adsorbent particles, such that the filter outer face has an L-value of 60 or less, and reflective particles present at the exposed outer face of the filter which are clearly visible to a user wherein different reflective particles or combinations of reflective particles are used with different darkly colored adsorbent filters to differentiate the filters based on grade or performance.

9. A method of differentiating various adsorbent particle filters of claim 8 wherein the reflective particles are attached to the adsorbent filter by an adhesive wherein the filters have an L-value of less than 20.

* * * * *